(12) United States Patent
Santini et al.

(10) Patent No.: US 12,140,076 B2
(45) Date of Patent: Nov. 12, 2024

(54) TURBOMACHINERY PLANT COMPRISING A MECHANICAL DRIVE HYBRID GAS TURBINE AND A DYNAMIC COOLING SYSTEM FOR THE MECHANICAL DRIVE HYBRID GAS TURBINE

(71) Applicant: NUOVO PIGNONE TECNOLOGIE - SRL, Florence (IT)

(72) Inventors: Marco Santini, Florence (IT); Fabio Baldanzini, Florence (IT)

(73) Assignee: Nuovo Pignone Tecnologies—SRL, Florence (IT)

( * ) Notice: Subject to any disclaimer, the term of this patent is extended or adjusted under 35 U.S.C. 154(b) by 0 days.

(21) Appl. No.: 18/557,858

(22) PCT Filed: Apr. 22, 2022

(86) PCT No.: PCT/EP2022/025173
§ 371 (c)(1),
(2) Date: Oct. 27, 2023

(87) PCT Pub. No.: WO2022/228724
PCT Pub. Date: Nov. 3, 2022

(65) Prior Publication Data
US 2024/0209781 A1    Jun. 27, 2024

(30) Foreign Application Priority Data
Apr. 29, 2021    (IT) .................... 102021000010889

(51) Int. Cl.
*F02C 7/143*    (2006.01)
*F01D 15/10*    (2006.01)
*F02C 7/12*    (2006.01)

(52) U.S. Cl.
CPC .............. *F02C 7/143* (2013.01); *F01D 15/10* (2013.01); *F02C 7/12* (2013.01); *F05D 2220/32* (2013.01);
(Continued)

(58) Field of Classification Search
CPC .. F02C 7/143; F02C 7/12; F01D 15/10; F05D 2220/32; F05D 2220/76; F05D 2260/213
See application file for complete search history.

(56) References Cited

U.S. PATENT DOCUMENTS 5,758,502 A * 6/1998 Utamura ................. F02C 7/143
60/783
8,132,421 B2    3/2012 Ueda
(Continued)

FOREIGN PATENT DOCUMENTS

| EP | 1500804 A2 | 1/2005 |
| EP | 3623603 A1 | 3/2020 |
| WO | 2013020034 A2 | 2/2013 |

OTHER PUBLICATIONS

"VFC for Compressor in oil and gas industry," Variable Frequency Drives (2021).

*Primary Examiner* — David P. Olynick
(74) *Attorney, Agent, or Firm* — Paul Frank + Collins P.C.

(57) ABSTRACT

A turbomachinery plant comprises a mechanical hybrid gas turbine and a cooling system for the mechanical hybrid gas turbine conceived to increase/decrease a flow rate of a refrigerant fluid cooled by a chiller so as to an amount of air in an air filter chamber of a gas turbine module reaches a temperature corresponding to a predetermined temperature value associated to a predetermined power value of a gas turbine in a first degradation curve or an amount of air in an electrical reversible machine of a variable frequency drive electric unit reaches a temperature value corresponding to a (Continued)

predetermined temperature value associated to a predetermined power value of the electrical reversible machine in a second degradation curve, depending on a power demand. Also disclosed is a method for cooling an amount of air in a gas turbine module and in a variable frequency drive electric unit.

18 Claims, 6 Drawing Sheets

(52) U.S. Cl.
CPC .... *F05D 2220/76* (2013.01); *F05D 2260/213* (2013.01)

(56) References Cited

U.S. PATENT DOCUMENTS

| | | |
|---|---|---|
| 8,950,191 B2 | 2/2015 | Landis et al. |
| 9,863,317 B2 | 1/2018 | Santini et al. |
| 9,876,412 B2 | 1/2018 | Santini et al. |
| 2008/0178590 A1* | 7/2008 | Chillar ................. F01K 17/005 60/597 |
| 2019/0226708 A1 | 7/2019 | Craft |
| 2020/0088099 A1* | 3/2020 | Roberge ................. F02C 7/224 |
| 2020/0191021 A1 | 6/2020 | Santini et al. |

* cited by examiner

TURBOMACHINERY PLANT COMPRISING A MECHANICAL DRIVE HYBRID GAS TURBINE AND A DYNAMIC COOLING SYSTEM FOR THE MECHANICAL DRIVE HYBRID GAS TURBINE

TECHNICAL FIELD

The present disclosure concerns a turbomachinery plant comprising a mechanical drive hybrid gas turbine and a dynamic cooling system for the mechanical hybrid gas turbine.

Background Art

The gas turbine hybridization concept is applicable to mechanical drive application on new units or as upgrade on existing trains. It leverages the wide range capability synergy that the gas turbine in combination with a variable frequency drive electric unit comprising an electrical reversible machine and a VFD control panel for the electrical reversible machine, can offer.

The electrical reversible machine can supply power to the gas turbine so as to work as helper device for the gas turbine or can absorb power from the gas turbine so as to work as a generator.

A gas turbine is sensitive to the ambient temperature and when it is necessary to obtain a certain power value, because such power value is required by the needs, it is necessary to cool a thermal fluid vector or refrigerant fluid flowing in the gas turbine, so that the power of the gas turbine can be increased.

This is due to the fact that the density of the air increased when the refrigerant fluid is cooled.

Currently a turbomachinery plant is provided with a cooling system to cool at least the air in the gas turbine and the air in the electrical reversible machine.

However, cooling system of known type used in a turbomachinery plant are conceived and designed to work in the worst operating conditions, i.e., on the basis of the ambient temperature. Usually, the working temperature depends substantially on the ambient temperature.

As a result, a cooling system of known type is configured to work on the basis of the maximum value of the ambient temperature.

Accordingly, a turbomachinery plant with a dynamic cooling system would be welcomed in the technology of mechanical drive gas turbine.

SUMMARY

In one aspect, the subject matter disclosed herein is directed to a turbomachinery plant. The turbomachinery plant comprises a gas turbine module, a variable frequency drive electric unit and a cooling system.

The gas turbine module comprises a gas turbine and an air filter chamber.

The variable frequency drive electric unit comprises an electrical reversible machine which supplies/absorbs power.

The cooling system cools a refrigerant fluid which serves to cool air in the air filter chamber and the air in the electrical reversible machine. The cooling system comprises a chiller and a pumping device, connected to the chiller, for pumping the refrigerant fluid cooled by the chiller, as well as a first valve to change the flow rate of an amount of refrigerant fluid flowing on a first line connecting the chiller to the air filter chamber, a first measurement and control device configured to measure a first temperature value referred to the air in the air filter chamber and to control the first valve, a second valve to change the flow rate of an amount of the refrigerant fluid flowing on a second line connecting the chiller to the electrical reversible machine and a second measurement and control device configured to measure a second temperature value referred to the refrigerant fluid cooled by the chiller and to control the second valve.

By means of a control central unit it is possible to store a first degradation curve associated to the gas turbine, wherein a predetermined first temperature value is associated to a predetermined first power value, and a second degradation curve associated to the electrical reversible machine, wherein a predetermined second temperature value is associated to a predetermined second power value, and set a temperature reference value for the refrigerant fluid, so that the refrigerant fluid exiting the chiller has the temperature reference value.

The control central unit activates the pumping device and controls each valve. The first valve and the second valve are controlled independently from each other, by means of the respective measurement and control device and the flow rate of the refrigerant fluid cooled by the chiller is increased/decreased, in such a way that, depending on a power demand, either the air in the air filter chamber reaches a predetermined first temperature value associated to a predetermined first power value of the gas turbine in the first degradation curve, or the air in the electrical reversible machine reaches a predetermined second temperature value associated to a predetermined second power value of the electrical reversible machine in the second degradation curve.

Particularly, the first valve is controlled on the basis of the difference between the first temperature value measured by the first measurement and control device and a predetermined first temperature value associated to a predetermined first power of the gas turbine corresponding to a first power value required by the power demand and the second valve is controlled on the basis of the difference between the second temperature value measured by the second measurement and control device and a predetermined second temperature value associated to a predetermined second power of the electrical reversible machine corresponding to a second power value required by the power demand.

In another aspect, through the cooling system it is possible to cool the refrigerant fluid passing through a VFD control panel being part of the variable frequency drive electric unit to control the electrical reversible machine. A third line connects the chiller to the VFD control panel, a third valve is configured to change the flow rate of an amount of refrigerant fluid flowing on the third line, a third measurement and control device is configured to measure a third temperature value referred to the refrigerant fluid cooled by the chiller and to control the third valve. In this case, the pumping device, when in use, pumps an amount of refrigerant fluid cooled by the chiller also into the third line and the control central unit is connected to the third measurement and control device and configured to store in the storage means a third degradation curve associated to the VFD control panel, wherein a predetermined third temperature value is associated to a predetermined third power value, and to control the third valve, independently from the first valve and the second valve, through the third measurement and control device to increase/decrease a flow rate of the refrigerant fluid cooled by the chiller in such a way that the refrigerant fluid in the VFD control panel reaches a predetermined third temperature value associated to a predetermined third power value of the VFD control panel in the third degradation curve, depending on the power demand.

The third valve is controlled on the basis of the difference between the third temperature value measured by the third measurement and control device and a predetermined third temperature value associated to a predetermined third power of the VFD control panel corresponding to a third power value required by the power demand.

In another aspect the subject matter is directed to a method for cooling an amount of air in a gas turbine module, in particular in the air filter chamber, and an amount of air in a variable frequency drive electric unit. The method comprises the step of pumping the refrigerant fluid by means of the pumping device, the step of measuring a first temperature value referred to the air in the air filter chamber by means of the first measurement and control device, the step of measuring a second temperature value referred to the air in the electrical reversible machine by means of the second measurement and control device. Furthermore, the method comprises the step of setting a temperature reference value for the refrigerant fluid with respect to a first degradation curve associated to the gas turbine and to a second degradation curve associated to the electrical reversible machine, depending on a power demand, and the step of controlling the first valve and the second valve, independently from each other, through the respective measurement and control device, to increase/decrease a flow rate of the refrigerant fluid cooled by the chiller in such a way that either the air in the air filter chamber reaches the a predetermined first temperature value associated to a predetermined first power value of the gas turbine in the first degradation curve, or the air in the electrical reversible machine reaches a predetermined second temperature value associated to a predetermined second power value of the electrical reversible machine in the second degradation curve, depending on the power demand.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

In the field of power production, a turbomachinery plant comprises in combination a gas turbine and an electrical reversible machine capable of supplying/absorbing power. The electrical reversible machine works as helper of the gas turbine when it supplies power to the gas turbine and produces energy when absorbs power. This turbomachinery plant requires the presence of a cooling system for the electrical machine reversible and for the VFD control panel to operate correctly. Therefore, a thermal vector fluid or refrigerant fluid is used in the electrical reversible machine and in the VFD control panel. The cooling system is designed to match the operating conditions to the worst operating conditions defined on the maximum value of the ambient temperature, so that the real operating temperature of the refrigerant fluid is affected by the ambient temperature unless a chiller is used. The adoption of a chiller (regardless the kind of chiller) implies an undesired consumption of energy and a loss of efficiency of the performance of the cooling system, because it does not work at a temperature required to obtain a predetermined power value required by the needs but it works at a fixed temperature for which the chiller has been designed, generally 5° C. The present subject matter is thus directed to a turbomachinery plant comprising a cooling system to cool at least the air into a gas turbine and the air into an electrical reversible machine by means of a refrigerant fluid, such as water, cooled by a chiller whose temperature and flow rate can be changed over time on the basis of a power demand. The power demand can be defined by the power required by the gas turbine or the power required to the electrical reversible.

Particularly, it is possible to change over time the temperature of the refrigerant fluid and its flow rate on the basis of the respective degradation curves associated to the gas turbine and the electrical reversible machine (and preferably the VFD control panel), so as to obtain high performance in terms of energy and at the same time to reduce the operating expense.

Therefore, the refrigerant fluid is subjected to a dynamic control to satisfy a power demand required by the customer needs.

Figure 1:
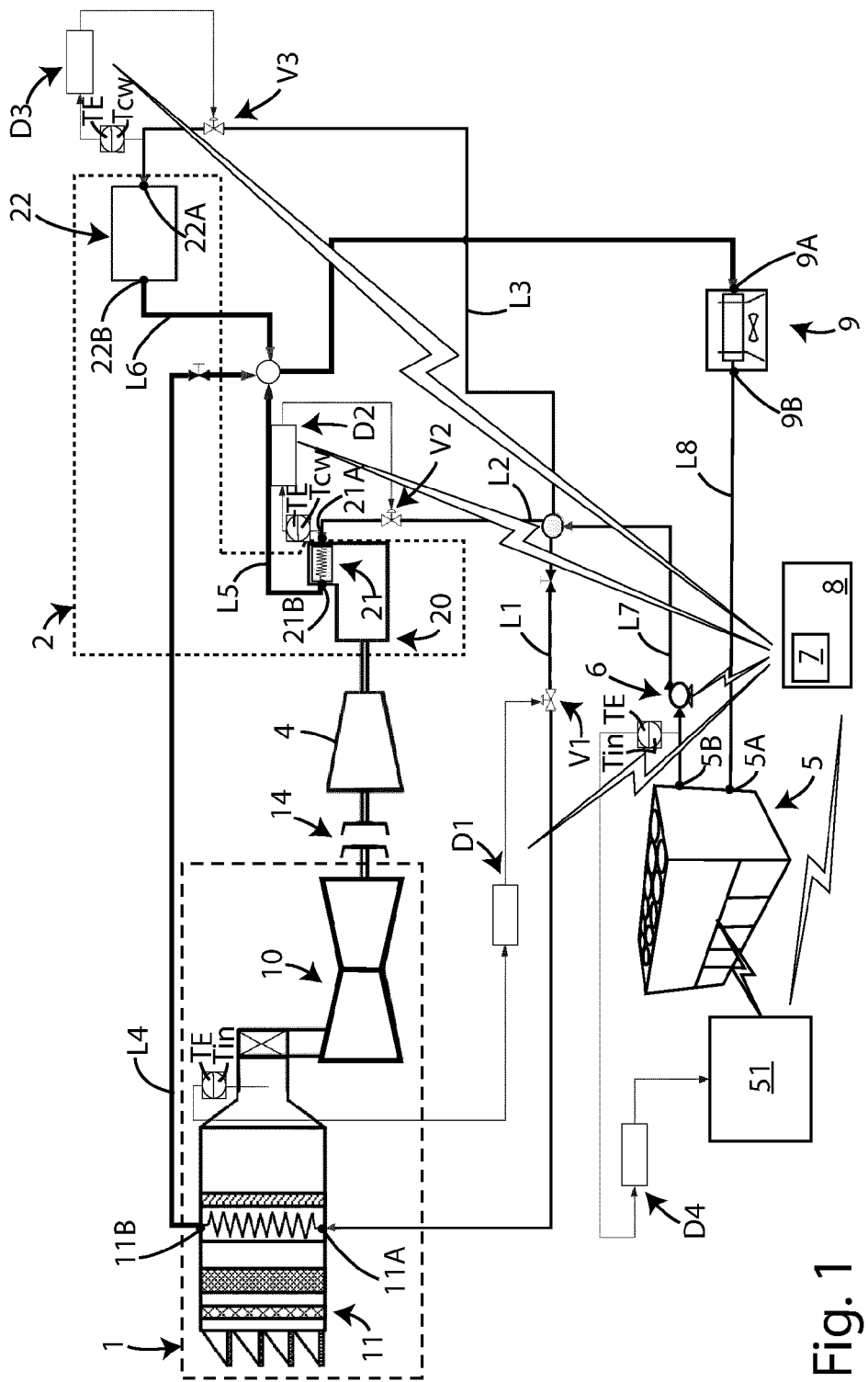
FIG. 1 illustrates a schematic view of a turbomachinery plant provided with a cooling system, according to a first embodiment, wherein the turbomachinery plant comprises a gas turbine module, comprising in turn an air filter chamber and a gas turbine, and a variable frequency drive electric unit, comprising in turn an electrical reversible machine and a VFD control panel for the electrical reversible machine.

Reference is now made to the drawings and particularly to FIG. 1 that shows a first embodiment of the turbomachinery plant according to the invention.

The turbomachinery plant comprises a gas turbine module 1 and a variable frequency drive electric unit 2, as well as a cooling system to cool a thermal fluid vector or refrigerant fluid.

The gas turbine module 1 comprises a gas turbine 10 and an air filter chamber 11 connected to the gas turbine 10. The air filter chamber 11 has a first inlet 11A to allow an amount of refrigerant fluid to enter the air filter chamber 11 and a second outlet 11B to allow the amount of the refrigerant fluid to exit the air filter chamber and the gas turbine module 1.

The variable frequency drive electric unit 2 comprises an electrical reversible machine 20 capable of supplying/absorbing power so that, when supplies power, the electrical reversible machine 20 works as helper of the gas turbine 10 and, when absorbs power, the electrical reversible machine 20 produces energy. The electrical reversible machine 20 has a second inlet 21A to allow an amount of the refrigerant fluid to enter the electrical reversible machine 20 and an outlet 21B to allow the amount of the refrigerant fluid to exit the electrical reversible machine 20.

Particularly, the electrical reversible machine 20 comprises an air cooler unit 21 configured to cool air in a closed loop by means of the passage of a refrigerant fluid through a heat exchanger (refrigerant fluid/air).

More particularly, the second inlet 21A and the second outlet 21B are arranged on the air cooler unit 21.

The cooling system is configured to cool the refrigerant fluid so that the refrigerant fluid has a temperature reference value. In the first embodiment being disclosed, the refrigerant fluid is water.

The cooling system comprises at least one chiller 5 configured to cool a fluid refrigerant, and at least a first line L1 connecting the chiller 5 to the air filter chamber 11 and a second line L2 connecting the chiller 5 to the electrical reversible machine 20, as well as at least one pumping device 6, connected to the chiller 5 and configured to pump the refrigerant fluid cooled by the chiller 5 in the first line L1, so that an amount of the refrigerant fluid enters the air filter chamber 11 through the first inlet 11A, and in the second line L2, so that an amount of the refrigerant fluid enters the electrical reversible machine 20 through the second inlet 21A.

The passage of an amount of the refrigerant fluid inside the air filter chamber 11 cools the air present in the air filter chamber 11 while the refrigerant fluid heats up because the air in the air filter chamber 11 transfers heat to the refrigerant fluid and the passage of an amount of the refrigerant fluid inside the electrical reversible machine 20 cools the air present in the electrical reversible machine 20 while the refrigerant fluid heats up because the air in the electrical reversible machine 20 transfers heat to the refrigerant fluid and therefore cools.

After passing through the air filter chamber 11 an amount of heated refrigerant fluid exits the air filter chamber itself on a fourth line L4 and after passing through the electrical reversible machine 20 an amount of heated refrigerant fluid exits the electrical reversible machine itself on a fifth line L5.

Particularly the chiller 5 has an inlet 5A to allow an amount of refrigerant fluid to enter the chiller and an outlet 5B to allow an amount of refrigerant fluid to exit the chiller 5. The pumping device 6 is connected to the outlet 5B of the chiller 5.

The cooling system comprises also a supply line L7 connected to the outlet 5B of the chiller 5 and a return line L8 connected to the inlet 5A of the chiller 5. The supply line L7 is connected to the first line L1 and the second line L2 and the return line L8 is connected to the fourth line L4 and the fifth line L5. The pumping device 6 is arranged on the supply line L7.

The turbomachinery plant further comprises storage means 7 (such as a memory) for storing data, and a control central unit 8 connected to the chiller 5, the pumping device 6 and the storage means 7. The control central unit 8 can be a programmable controller that may be implemented by a microprocessor or a PLC along with an I/O module. The control central unit 8 is configured to store at least in the storage means 7 a first degradation curve associated to the gas turbine 10, wherein a predetermined first temperature value is associated to a predetermined first power value, and a second degradation curve associated to the electrical reversible machine 20, wherein a predetermined second temperature value is associated to a predetermined second power value. The predetermined first temperature value is the temperature value of the air at the inlet 11A of the air filter chamber 11 and the predetermined second temperature value is the temperature value of the refrigerant fluid (i.e. water) at the inlet 21A of the electrical reversible machine 20.

Figure 2A:
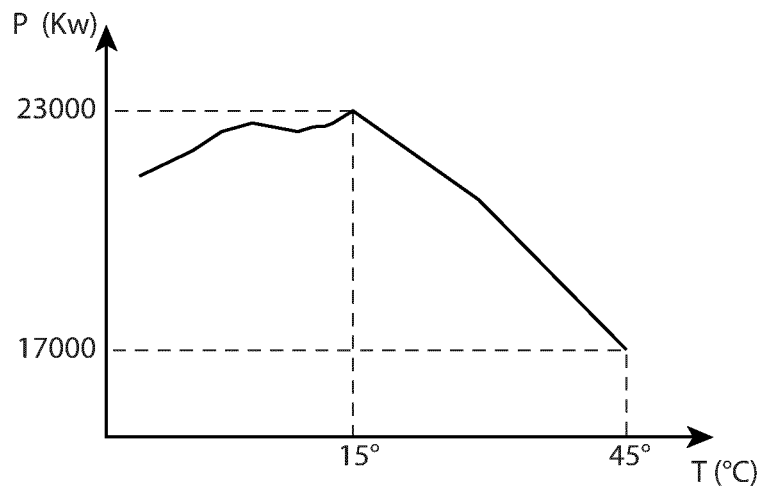
FIG. 2A shows a first degradation curve associated to the gas turbine on a Cartesian plane, wherein the x-axis is the air temperature at the inlet of the air filter chamber and the y-axis is the power of the gas turbine.
Figure 2B:
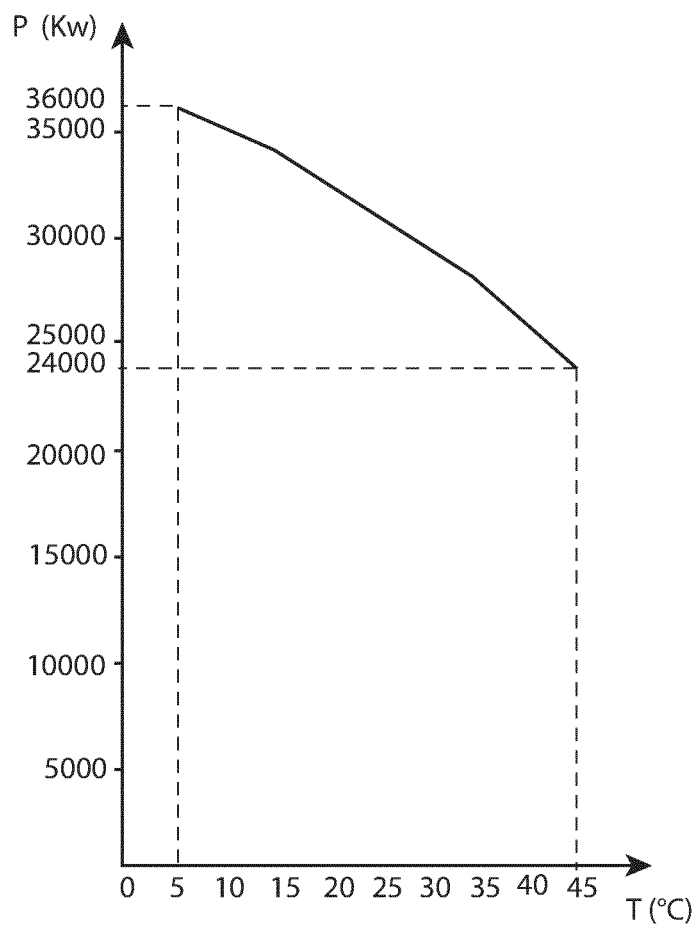
FIG. 2B shows a second degradation curve associated to the electrical reversible machine on a Cartesian plane, wherein the x-axis is the water temperature at the inlet of the electrical reversible machine and the y-axis is the power of the electrical machine.

A first example of the first degradation curve referred to the gas turbine 10 is shown in FIG. 2A and an example of the second degradation curve referred to the electrical reversible machine is shown in FIG. 2B.

The cooling system further comprises a first valve V1 to change the flow rate of an amount of refrigerant fluid flowing on the first line L1 and a first measurement and control device D1 configured to measure a first temperature value referred to the air in the air filter chamber 11 and to control the first valve V1, as well as at least one second valve V2 to change the flow rate of an amount of the refrigerant fluid flowing on the second line L2 and at least one second measurement and control device D2 configured to measure a second temperature value referred to the refrigerant fluid cooled by the chiller 5 and to control the second valve V2.

The central control unit 8 is configured to:
set a temperature reference value for the refrigerant fluid, so that the refrigerant fluid exiting the chiller 5 has the temperature reference value;
activate the pumping device 6; and
control each valve V1, V2, independently from each other, through the respective measurement and control device D1, D2, to increase/decrease a flow rate of the refrigerant fluid cooled by the chiller 5, so as to either the air in the air filter chamber 11 reaches a predetermined first temperature value associated to a predetermined first power value of the gas turbine 10 in the first degradation curve, or the air in the electrical reversible machine 20 reaches a predetermined second temperature value associated to a predetermined second power value of the electrical reversible machine 20 in the second degradation curve, depending on a power demand.

Particularly, the control central unit 8 is configured to control the first valve V1 on the basis of the difference between the first temperature value measured by the first measurement and control device D1 and a predetermined first temperature value associated to a predetermined first power of the gas turbine 10 corresponding to a first power value required by the power demand and control the second valve V2 on the basis of the difference between the second temperature value measured by the second measurement and control device D2 and a predetermined second temperature value associated to a predetermined second power of the electrical reversible machine 20 corresponding to a second power value required by the power demand.

The chiller 5 comprises a logic control unit 51 configured to communicate with the central control unit 8. Furthermore, the logic control unit 51 is connected to a fourth measurement and control device D4 configured to measure and control the temperature of the refrigerant fluid exiting the chiller 5.

More particularly, the central control unit 8 is connected to the logic control unit 51 of the chiller 5 and configured to:

decide that the temperature reference value for the refrigerant fluid is the minimum value between the predetermined first temperature value associated to the predetermined first power value required by the gas turbine 10 and the predetermined second temperature value associated to the predetermined second power value required by electrical reversible machine 20; and send the temperature reference value to the logic control unit 51 of the chiller 5, so that the logic control unit 51 sets the temperate value of the chiller 5 equal to the temperature reference value.

The central control unit 8 is configured to control the first measurement and control device D1 in such a way that the first measurement and control device D1 controls in turns the first valve V1 to:
increase the flow rate of the refrigerant fluid, when the first temperature value measured by the first measurement and control device D1 is greater than that the predetermined first temperature value associated to a predetermined first power of the gas turbine 10 corresponding to a first power value required by the power demand, and
decrease the flow rate of the refrigerant fluid, when the first temperature value measured by the first measurement and control device D1 is less than the predetermined first temperature value associated to a predetermined first power of the gas turbine 10 corresponding to a first power value required by the power demand.

Furthermore, the central control unit 8 is configured to turn the chiller 5 off when the flow rate of the refrigerant fluid decreases below a first predetermined value.

The central control unit 8 is configured to control the second measurement and control device D2 in such a way that the second measurement and control device D2 controls in turns the second valve V2 to:
increase the flow rate of the refrigerant fluid, when the second temperature value measured by the second measurement and control device D2 is greater than that the predetermined second temperature value associated to a predetermined second power of the electrical reversible machine 20 corresponding to a second power value required by the power demand, and
decrease the flow rate of the refrigerant fluid, when the second temperature value measured by the second measurement and control device D2 is less than the predetermined second temperature value associated to a predetermined second power of the electrical reversible machine 20 corresponding to a second power value required by the power demand.

Furthermore, the central control unit 8 is configured to turn the chiller 5 off when the flow rate of the refrigerant fluid decreases below a second predetermined value, different from the first predetermined value.

As shown in FIG. 1, the variable frequency drive electric unit 2 further comprises a VFD control panel 22 configured to control the electrical reversible machine 20 and the cooling system comprises a third line L3 connecting the chiller 5 to the VFD control panel 22, as well as a third valve V3 to change the flow rate of an amount of refrigerant fluid flowing on the third line L3 and a third measurement and control device D3 configured to measure a third temperature value referred to the refrigerant fluid cooled by the chiller 5 and to control the third valve V3.

The VFD control panel 22 has a third inlet 22A to allow an amount of the refrigerant fluid to enter the VFD control panel 22 and an outlet 22B to allow the amount of the refrigerant fluid to exit the VFD control panel 22.

When the refrigerant fluid flows inside the VFD control panel 22, the refrigerant fluid cools the electrical components arranged inside the VFD control panel 22, particularly one or more modulation devices to modulate the electrical current (wherein such modulation device comprises static switches and/or one or more trystors, etc.), while the refrigerant fluid heats up because electrical components transfer heat to the refrigerant fluid.

After passing through the VFD control panel 22 an amount of heated refrigerant fluid exits the VFD control panel itself on a sixth line L6. The return line L8 is connected also to the sixth line L6.

The pumping device 6 is configured to pump an amount of refrigerant fluid cooled by the chiller 5 into the VFD control panel 22 by means of the third line L3.

The control central unit 8 is connected to the third measurement and control device D3 and is configured to:
store in the storage means 7 a third degradation curve associated to the VFD control panel 22, wherein a predetermined third temperature value is associated to a predetermined third power value; and
control the third valve V3, independently from the first valve V1 and the second valves V2, through the third measurement and control device D3 to increase/decrease a flow rate of the refrigerant fluid cooled by the chiller 5 in such a way that the refrigerant fluid in the VFD control panel 22 reaches a predetermined third temperature value associated to a predetermined third power value of the VFD control panel 22 in the third degradation curve, depending on the power demand.

The predetermined third temperature value is the temperature value of the refrigerant fluid (i.e. water) at the inlet 22A of the VFD control panel 22.

Particularly, the control central unit 8 is configured to control the third valve V3 on the basis of the difference between the third temperature value measured by the third measurement and control device D3 and a predetermined third temperature value associated to a predetermined third power of the VFD control panel 22 corresponding to a third power value required by the power demand.

More particularly, the central control unit 8 is configured to decide that the temperature reference value for the refrigerant fluid is the minimum value between the predetermined first temperature value associated to the predetermined first power value required by the gas turbine 10 and the predetermined second temperature value associated to the predetermined second power value required by the electrical reversible machine 20 and the predetermined third temperature value associated to the predetermined third power value required by the VFD control panel 22.

The central control unit 8 is configured to control the third measurement and control device D3 in such a way that the third measurement and control device D3 controls in turns the third valve V3 to:
increase the flow rate of the refrigerant fluid, when the third temperature value measured by the third measurement and control device D3 is greater than that the predetermined third temperature value associated to a predetermined third power of the VFD control panel 22 corresponding to a third power value required by the power demand, and
decrease the flow rate of the refrigerant fluid, when the third temperature value measured by the third measurement and control device D3 is less than the predetermined third temperature value associated to a predetermined third power of the VFD control panel 22 corresponding to a third power value required by the power demand.

Furthermore, the central control unit 8 is configured to turn the chiller 5 off when the flow rate of the refrigerant fluid decreases below a third predetermined value, different from the first and second predetermined values or different only from the first predetermine value (when the second degradation curve is equal to the third degradation curve).

The cooling system further comprises a cooler device 9 connected in series to the inlet 5A of the chiller 5. The cooler device 9 is arranged on the return line L8 connected to the inlet 5A of the chiller 5. In the embodiment being disclosed the cooler device 9 is an air cooler device. However, it can be a water cooler device without departing from the scope of the invention.

The turbomachinery plant comprises a first compressor 4 called process compressor, preferably a centrifugal compressor, and the first compressor 4 is arranged between the gas turbine module 1 and the variable frequency drive electric unit 2. Preferably, the compressor 4 is connected to the gas turbine 10 by means of a self synchronizing clutch 14. The cooler device 9 reduces the energy spent to cool the refrigerant fluid because generally a cooler device absorbs less power than a chiller when in use, and the chiller will be turned on only when the cooler device cannot cool the refrigerant fluid in order to the temperature of the refrigerant fluid is the desired temperature.

Therefore, the so called "train system" comprises a gas turbine module 1, a compressor 4 (i.e. the first process compressor) and a variable frequency drive electric unit 2, arranged in succession.

Generally, a system comprising a power source, transmission equipment, and a load, such as a compressor, may be referred to as a "train" or "train system" or "train plant".

Figure 3:
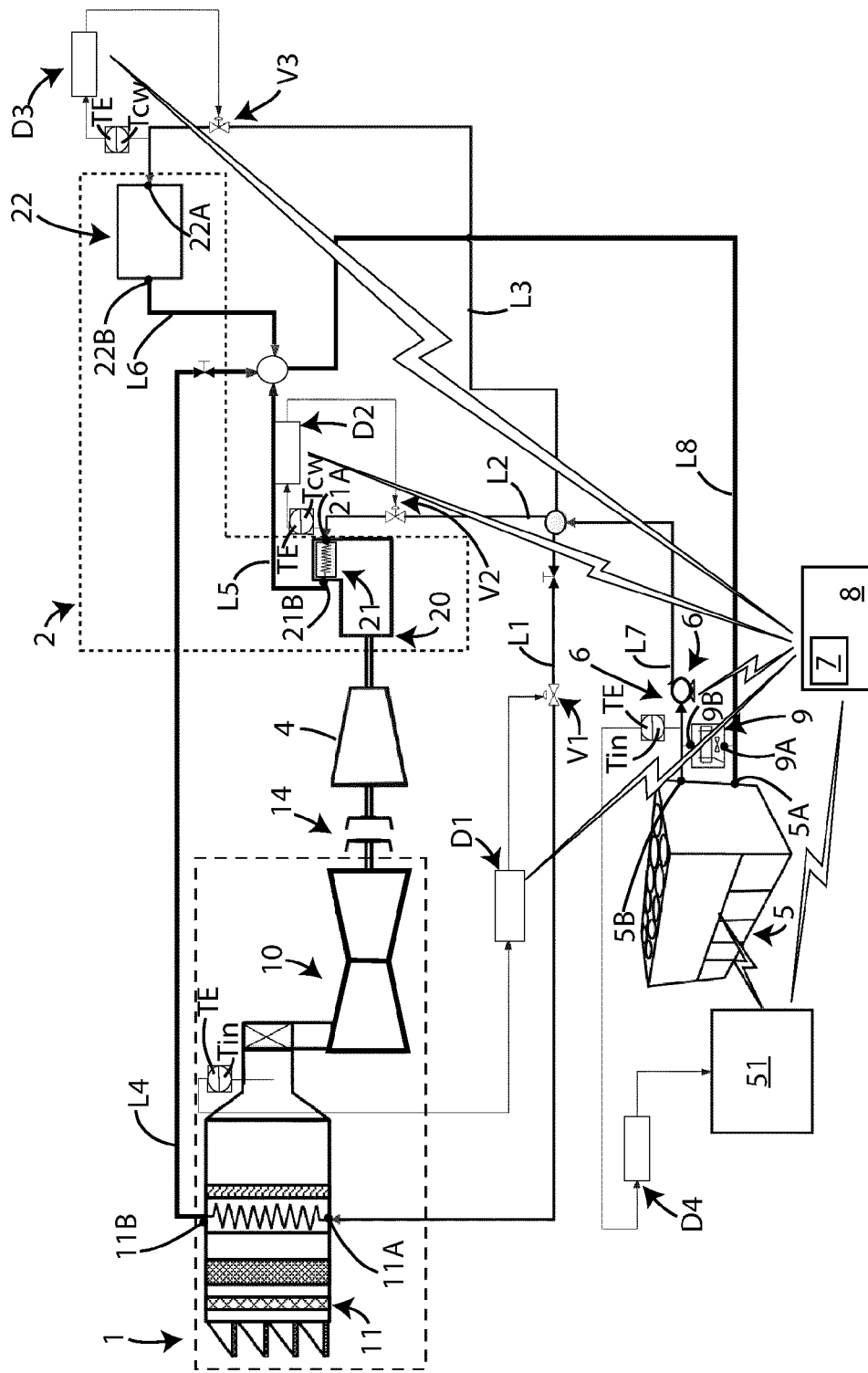
FIG. 3 illustrates a schematic view of a turbomachinery plant according to a second embodiment.

In a second embodiment of the turbomachinery plant, shown in FIG. 3, differently from the first embodiment, the cooler device 9 of the cooling system is connected in parallel between the inlet 5A and the outlet 5B of the chiller 5. Particularly, the cooler device 9 is arranged between the supply line L7 and the return line L8.

Figure 4:
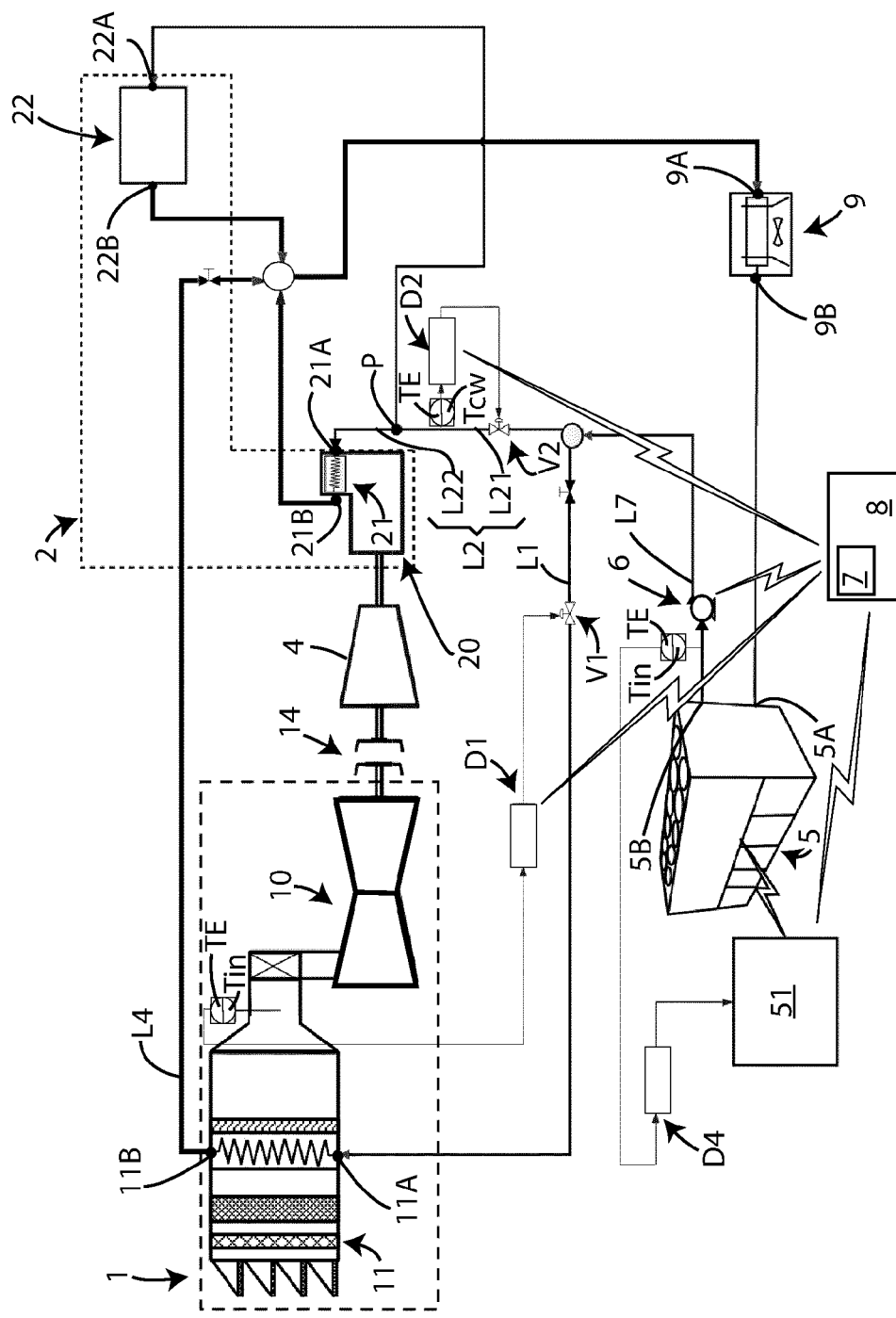
FIG. 4 illustrates a schematic view of a turbomachinery plant according to a third embodiment.

In a third embodiment of the turbomachinery plant, shown in FIG. 4, the cooling system is provided with a single valve and a single measurement and control device for the refrigerant fluid flowing in the second line L2 and the third line L3.

Such third embodiment is used when the third degradation curve associated to the VFD control panel 22 is equal to the second degradation curve associated to the electrical reversible machine 20 and then it is not necessary that cooling system has a respective valve and a respective measurement and control device for the electrical reversible machine and the VFD control panel.

Therefore, differently from the first embodiment above disclosed, only the second valve V2 and the measurement and control device D2 are provided to control the temperature and the flow rate of an amount of refrigerant fluid that enters the electrical reversible machine 20 and the VFD control panel 22.

The third line L3 connects the VFD control panel 22 to the second line L2 in a point P in such a way that the second line L2 is subdivided in a first part L21 and a second part L22. The first part L21 connects the point P to the outlet 5B of the chiller 5 by means of the seven L7 and the second part L22 connects the point P to the inlet 21A of the electrical reversible machine 21. The second valve V2 is arranged on the first part L21 of the second line L2.

It is not necessary that the control central unit 8 is configured to store in the storage means 7 the third degradation curve associated to the VFD control panel 22, wherein a predetermined third temperature value is associated to a predetermined third power value. In fact, since the third degradation curve is equal to the second degradation curve, the temperature reference value decided by the control central unit 8 is the minimum value between the predetermined first temperature value associated to the predetermined first power value required by the gas turbine 10 and the predetermined second temperature value associated to the predetermined second power value required by the electrical reversible machine 20 that is equal to the predetermined third temperature value associated to a predetermined third power value required by the VFD control panel 22.

In further embodiments not shown in Figures, differently from the embodiments above disclosed, the cooling system can comprise at least two chillers and two pumping devices, wherein each chiller is configured to cool a respective amount of refrigerant fluid and each pumping device is connected to a respective chiller and configured to pump a respective amount of refrigerant fluid cooled by a respective chiller into the air filter chamber and into the electrical reversible machine respectively trough a respective line L1, L2. In particular the cooling system can comprises three chillers and three pumping devices, wherein each chiller is configured to cool a respective amount of refrigerant fluid and each pumping device is connected to a respective chiller and configured to pump a respective amount of refrigerant fluid cooled by a respective chiller into the air filter chamber 11, into the electrical reversible machine 20 and into the VFD control panel 22 respectively through a respective line L1, L2, L3.

Figure 5:
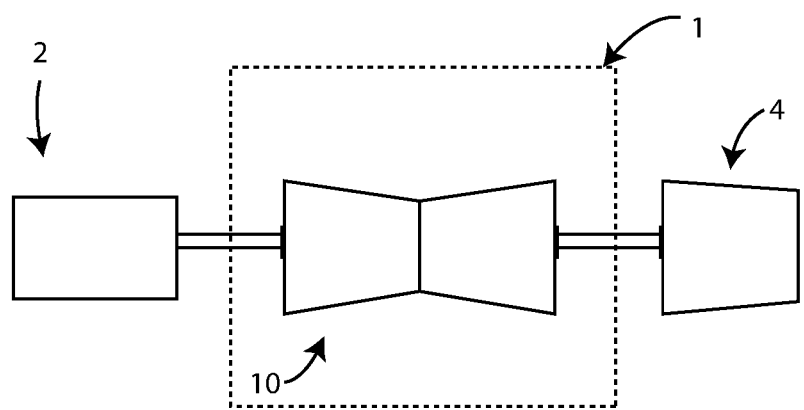
FIG. 5 illustrates a schematic view of a train included in a turbomachinery plant according to a fourth embodiment.
Figure 6:
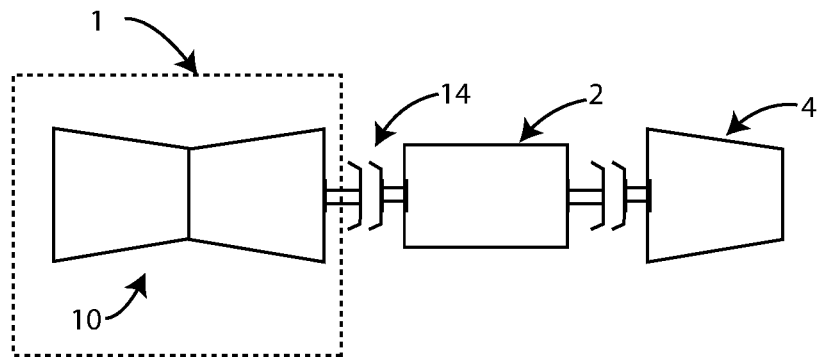
FIG. 6 illustrates a schematic view of a train included in a turbomachinery plant according to a fifth embodiment.

FIGS. 4, 5 and 6 show a respective train system that can be used in each of the embodiments above disclosed to replace the train system mounted in each embodiment.

Hereinafter each train system will be described with reference to the first embodiment above disclosed, so that further embodiments result.

In a fourth embodiment of the turbomachinery plant, shown in FIG. 5, the turbomachinery plant comprises a first compressor 4 (i.e. the first process compressor), preferably a centrifugal compressor, and the gas turbine module 1 is arranged between the variable frequency drive electric unit 2 and the first compressor 4.

In other words, the train system comprises the variable frequency drive electric unit 2, the gas turbine module 1 and the compressor 4 arranged in succession.

In a fifth embodiment of the turbomachinery plant, shown in FIG. 6, the turbomachinery plant comprises a first compressor 4 (i.e. the first process compressor), preferably a centrifugal compressor, and the variable frequency drive electric unit 2 is arranged between the gas turbine module 1 and the first compressor 4. Preferably, the variable frequency drive electric unit 2 is connected to the first compressor 4 and to the gas turbine 10 by means of a respective self synchronizing clutch 14.

In other words, the train system comprises the gas turbine module 1, the variable frequency drive electric unit 2 and the first compressor 4 arranged in succession.

Figure 7:
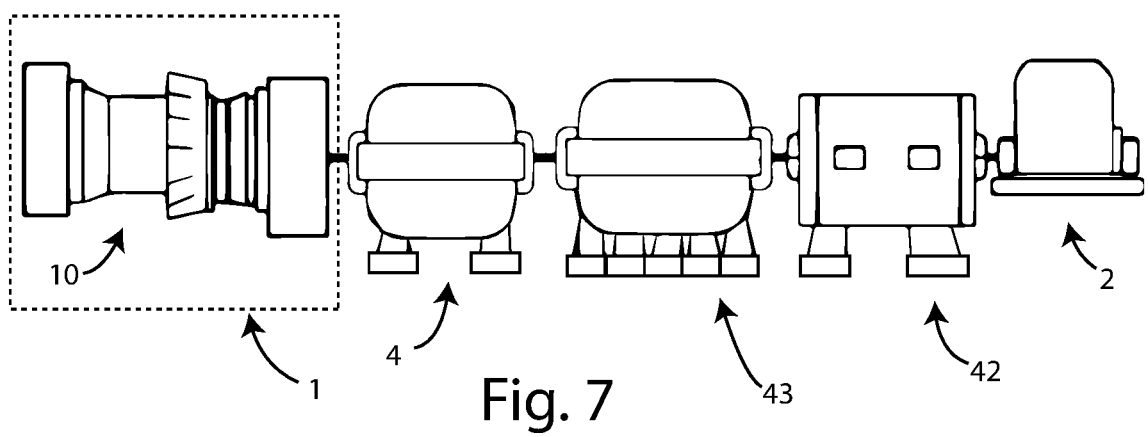
FIG. 7 illustrates a schematic view of a train included in a turbomachinery plant according to a sixth embodiment.

In a sixth embodiment of the turbomachinery plant, shown in FIG. 7, the turbomachinery plant comprises a first compressor 4, a second compressor 42 (i.e. a second process compressor), a third compressor 43 (i.e. a third process compressor) and a variable frequency drive electric unit 2, wherein the third compressor 43 is arranged between the first compressor 4 and the second compressor 42, wherein the first compressor 4 is connected to the gas turbine module 1 and the second compressor 42 is connected to the variable frequency drive electric unit 2. Each of the compressors above mentioned is a process compressor.

In other words, the train system comprises the gas turbine module 1, the first compressor 4, the third compressor 43, the second compressor 42 and the variable frequency drive electric unit 2 arranged in succession.

Figure 8:
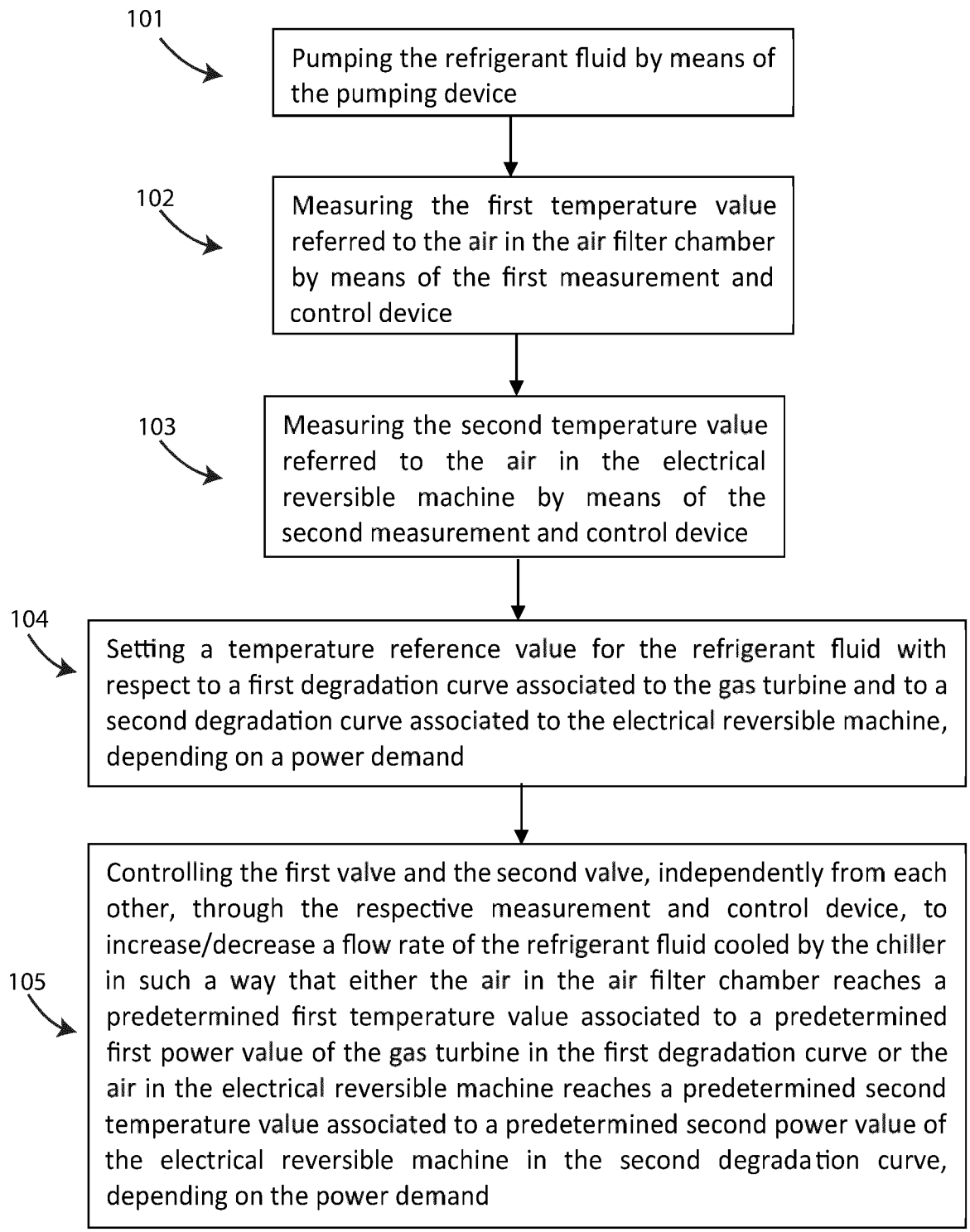
FIG. 8 illustrate a flow chart of a method for cooling at least air in the air filter chamber of a gas turbine module and air in the electrical reversible machine of a variable frequency drive electric unit according to the present disclosure.

FIG. 8 shows a flowchart summarizing a method for cooling at least an amount of air in the gas turbine module 1 and amount of air in the variable frequency drive electric unit 2, wherein the gas turbine module 1 comprises a gas turbine 10 and an air filter chamber 11 and the variable frequency drive electric unit 2 comprises an electrical reversible machine 20, by means of a cooling system comprising a chiller 5 for cooling a refrigerant fluid, a first line L1 connecting the chiller 5 to the air filter chamber 11, a second line L2 connecting the chiller 5 to the electrical reversible machine 20, and a pumping device 6 for pumping the refrigerant fluid at least in the first line L1 and the second line L2, as well as a first valve V1 to change a flow rate of an amount of refrigerant fluid flowing on the first line L1, a first measurement and control device D1 configured to measure a first temperature value referred to the air in the air filter chamber 11 and control the first valve V1, a second valve V2 to change a flow rate of an amount of refrigerant fluid flowing on the second line L2, a second measurement and control device D2 configured to measure a second temperature value referred to the air in the electrical reversible machine 20 and control the second valve V2.

The method comprises the following steps:
pumping 101 the refrigerant fluid by means of the pumping device 6;
measuring 102 a first temperature value referred to the air in the air filter chamber 11 by means of the first measurement and control device D1;
measuring 103 a second temperature value referred to the air in the electrical reversible machine 20 by means of the second measurement and control device D2;
setting 104 a temperature reference value for the refrigerant fluid with respect to a first degradation curve associated to the gas turbine 10, wherein a predetermined first temperature value is associated to a predetermined first power value, and to a second degradation curve associated to the electrical reversible machine 20, wherein a predetermined second temperature value is associated to a predetermined second power value, depending on a power demand, so that the temperature of the refrigerant fluid exiting the chiller 5 is equal to the temperature reference value; and
controlling 105 the first valve V1 and the second valve V2, independently from each other, through the respective measurement and control device D1, D2, to increase/decrease a flow rate of the refrigerant fluid cooled by the chiller 5 in such a way that
either the air in the air filter chamber 11 reaches a predetermined first temperature value associated to a predetermined first power value of the gas turbine 10 in the first degradation curve, or
the air in the electrical reversible machine 20 reaches the predetermined temperature value to a predetermined second power value of the electrical reversible machine 20 in the second degradation curve, depending on the power demand.

An advantage of the present technical solution is to optimize the cooling of a thermal fluid vector or fluid refrigerant (such as water) over time based on the degradation curves, depending on a power demand, so as to minimize the required operating expense and at the same time maximizing the performance of the turbomachinery plant.

Another advantage is given by the possibility to use a mechanical drive hybrid gas turbine.

A further advantage is that the performance of the electrical reversible machine in supplying power is not impacted by the temperature ambient.

While aspects of the invention have been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

Reference has been made in detail to the embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:
1. A turbomachinery plant comprising: a gas turbine module comprising:
a gas turbine and an air filter chamber;
a variable frequency drive electric unit comprising an electrical reversible machine capable of supplying/absorbing power;
a cooling system comprising
at least one chiller for cooling a refrigerant fluid,
a first line connecting the chiller to the air filter chamber,
a second line connecting the chiller to the electrical reversible machine, and
at least one pumping device, connected to the chiller and configured to pump the refrigerant fluid cooled by the chiller at least in the first line and the second line; and
wherein the turbomachinery plant further comprises:
storage means for storing data,
a control central unit connected to the chiller, the pumping device and the storage means and configured to store in the storage means a first degradation curve associated to the gas turbine, wherein a predetermined first temperature value is associated to a predetermined first power value, and a second degradation curve associ- ated to the electrical reversible machine, wherein a predetermined second temperature value is associated to a predetermined second power value;

wherein the cooling system further comprises:
- a first valve to change a flow rate of an amount of refrigerant fluid flowing on the first line;
- a first measurement and control device configured to measure a first temperature value associated with the air in the air filter chamber and to control the first valve;
- a second valve to change a flow rate of an amount of the refrigerant fluid flowing on the second line; and
- a second measurement and control device configured to measure a second temperature value associated with the refrigerant fluid cooled by the chiller and to control the second valve; and wherein the central control unit is configured to:
- set a temperature reference value for the refrigerant fluid, so that the refrigerant fluid exiting the chiller has the temperature reference value;
- activate the pumping device; and
- control each valve, independently from each other, through the respective first and second measurement and control devices, to increase or decrease a flow rate of the refrigerant fluid cooled by the chiller, so as to either the air in the air filter chamber reaches a predetermined first temperature value associated with the predetermined first power value of the gas turbine in the first degradation curve, or the air in the electrical reversible machine reaches a predetermined second temperature value associated with the predetermined second power value of the electrical reversible machine in the second degradation curve, depending on a power demand.

2. The turbomachinery plant of claim 1, wherein the control central unit is configured to control the first valve on the basis of a difference between the first temperature value measured by the first measurement and control device and a predetermined first temperature value associated with the predetermined first power value of the gas turbine corresponding to a first power value required by the power demand and control the second valve on the basis of a difference between the second temperature value measured by the second measurement and control device and a predetermined second temperature value associated with the predetermined second power value of the electrical reversible machine corresponding to a second power value required by the power demand.

3. The turbomachinery plant of claim 1, wherein the chiller comprises a logic control unit and the central control unit is connected to the logic control unit of the chiller and the central control unit is configured to:
- determine that the temperature reference value for the refrigerant fluid is a minimum value between the predetermined first temperature value associated with the predetermined first power value required by the gas turbine and the predetermined second temperature value associated with the predetermined second power value required by the electrical reversible machine; and
- send the determined temperature reference value to the logic control unit of the chiller, so that the logic control unit of the chiller sets the temperature value of the fluid refrigerant cooled by the chiller equal to the determined temperature reference value.

4. The turbomachinery plant of claim 1, wherein the central control unit is configured to:
- control the first measurement and control device such that the first measurement and control device controls the first valve to increase the flow rate of the refrigerant fluid in the first line, when the first temperature value measured by the first measurement and control device is greater than that the predetermined first temperature value associated with the predetermined first power value of the gas turbine corresponding to a first power value required by the power demand, and to decrease the flow rate of the refrigerant fluid in the first line, when the first temperature value measured by the first measurement and control device is less than the predetermined first temperature value associated with the predetermined first power of the gas turbine corresponding to the first power value required by the power demand; and
- control the second measurement and control device such that the second measurement and control device controls in turns the second valve to increase the flow rate of the refrigerant fluid in the second line, when the second temperature value measured by the second measurement and control device is greater than that the predetermined second temperature value associated with the predetermined second power value of the electrical reversible machine corresponding to a second power value required by the power demand, and to decrease the flow rate of the refrigerant fluid in the second line, when the second temperature value measured by the second measurement and control device is less than the predetermined second temperature value with the predetermined second power value of the electrical reversible machine corresponding to the second power value required by the power demand.

5. The turbomachinery plant of claim 1, wherein the electrical reversible machine comprises an air cooler unit configured to cool air in a closed loop by passing a refrigerant fluid through a heat exchanger.

6. The turbomachinery plant of claim 1, wherein the variable frequency drive electric unit further comprises a VFD control panel configured to control the electrical reversible machine, and wherein the cooling system comprises:
- a third line connecting the chiller to the VFD control panel,
- a third valve to change a flow rate of an amount of refrigerant fluid flowing on the third line,
- a third measurement and control device configured to measure a third temperature value associated with the refrigerant fluid cooled by the chiller and to control the third valve,
- wherein the pumping device is configured to pump an amount of refrigerant fluid cooled by the chiller into the third line, and
- wherein the control central unit is connected to the third measurement and control device and configured to:
  - store in the storage means a third degradation curve associated to the VFD control panel, wherein a predetermined third temperature value is associated to a predetermined third power value; and
  - control the third valve, independently from the first and second valves, through the third measurement and control device to increase or decrease a flow rate of the refrigerant fluid cooled by the chiller in such a way that the refrigerant fluid in the VFD control panel reaches the predetermined third temperature value with the predetermined third power value of the VFD control panel in the third degradation curve, depending on the power demand.

7. The turbomachinery plant of claim 6, wherein the control central unit is configured to control the third valve on the basis of a difference between the third temperature value measured by the third measurement and control device and the predetermined third temperature value associated to the predetermined third power of the VFD control panel corresponding to a third power value required by the power demand.

8. The turbomachinery plant of claim 6, wherein the chiller comprises a logic control unit and the central control unit is connected to the logic control unit of the chiller, and wherein the central control unit is configured to:
   determine that the temperature reference value for the refrigerant fluid in the chiller is a minimum value between the predetermined first temperature value associated with the predetermined first power value required by the gas turbine and the predetermined second temperature value associated to the predetermined second power value required by electrical reversible machine, and
   send the determined temperature reference value to the logic control unit of the chiller, so that the logic control unit of the chiller sets the temperature value of the fluid refrigerant equal to the temperature reference value, and
   wherein the central control unit is configured to determine that the temperature reference value for the refrigerant fluid is the minimum value between the predetermined first temperature value associated with the predetermined first power value required by the gas turbine and the predetermined second temperature value associated with the predetermined second power value required by the electrical reversible machine and the predetermined third temperature value associated with the predetermined third power value required by the VFD control panel.

9. The turbomachinery plant of claim 6, wherein the central control unit is configured to control the third measurement and control device such that the third measurement and control device controls the third valve to increase the flow rate of the refrigerant fluid in the third line, when the third temperature value measured by the third measurement and control device is greater than that the predetermined third temperature value associated with the predetermined third power value of the VFD control panel corresponding to a third power value required by the power demand, and to decrease the flow rate of the refrigerant fluid in the third line, when the third temperature value measured by the third measurement and control device is less than the predetermined third temperature value associated with the predetermined third power value of the VFD control panel corresponding to the third power value required by the power demand.

10. The turbomachinery plant of claim 1, wherein the cooling system comprises two chillers and two pumping devices, wherein each chiller is configured to cool a respective amount of refrigerant fluid and each pumping device is connected to a respective chiller and configured to pump a respective amount of refrigerant fluid cooled by the respective chiller into the air filter chamber and into the electrical reversible machine respectively.

11. The turbomachinery plant of claim 6, wherein the cooling system comprises three chillers and three pumping devices, wherein each chiller is configured to cool a respective amount of refrigerant fluid and each pumping device is connected to a respective chiller and configured to pump a respective amount of refrigerant fluid cooled by the respective chiller into the air filter chamber, into the electrical reversible machine and into the VFD control panel respectively.

12. The turbomachinery plant of claim 1 wherein the variable frequency drive electric unit further comprises a VFD control panel configured to control the electrical reversible machine, wherein the cooling system comprises:
   a third line connecting the VFD control panel to the second line in a point, such that the second line is subdivided into a first part and a second part, wherein the first part connects the point to the chiller and the second part connects the point to the electrical reversible machine, the second valve being arranged on the first part of the second line, and
   wherein a third degradation curve associated to the VFD control panel, wherein a predetermined temperature value is associated with a predetermined third power value, is equal to the second degradation curve.

13. The turbomachinery plant of claim 1, wherein the chiller has an inlet and an outlet, and wherein the cooling system comprises a cooler device connected in series to the inlet of the chiller or connected in parallel between the inlet and the outlet of the chiller.

14. The turbomachinery plant of claim 1, wherein the turbomachinery plant comprises a first compressor arranged between the gas turbine module and the variable frequency drive electric unit, and wherein the first compressor is connected to the gas turbine by means of a self synchronizing clutch.

15. The turbomachinery plant of claim 1, wherein the turbomachinery plant comprises a first compressor and the gas turbine module is arranged between the variable frequency drive electric unit and the first compressor.

16. The turbomachinery plant of claim 1, wherein the turbomachinery plant comprises a first compressor and the variable frequency drive electric unit is arranged between the gas turbine module and the first compressor.

17. The turbomachinery plant of claim 1, wherein the turbomachinery plant comprises a second compressor and a third compressor, wherein the third compressor is arranged between the first compressor and the second compressor, and wherein the first compressor is connected to the gas turbine module and the second compressor is connected to the variable frequency drive electric unit.

18. A method for cooling at least an amount of air in a gas turbine module and an amount of air in a variable frequency drive electric unit, wherein the gas turbine module comprises a gas turbine and an air filter chamber and the variable frequency drive electric unit comprises an electrical reversible machine, using a cooling system comprising a chiller for cooling a refrigerant fluid, a first line connecting the chiller to the air filter chamber, a second line connecting the chiller to the electrical reversible machine, and a pumping device for pumping a refrigerant fluid at least in the first line and the second line, as well as a first valve to change a flow rate of an amount of refrigerant fluid flowing on the first line, a first measurement and control device configured to measure a first temperature value associated with the air in the air filter chamber and control the first valve, a second valve to change a flow rate of an amount of refrigerant fluid flowing on the second line and a second measurement and control device configured to measure a second temperature value associated with the air in the electrical reversible machine and control the second valve, the method comprising the following steps:

pumping the refrigerant fluid using the pumping device;
measuring the first temperature value associated with the air in the air filter chamber using the first measurement and control device;
measuring the second temperature value associated with the air in the electrical reversible machine using the second measurement and control device;
setting a temperature reference value for the refrigerant fluid, so that a temperature of the refrigerant fluid exiting the chiller is equal to the temperature reference value, with respect to a first degradation curve associated with the gas turbine, wherein a predetermined first temperature value is associated with a predetermined first power value, and to a second degradation curve associated with the electrical reversible machine, wherein a predetermined second temperature value is associated with a predetermined second power value, depending on a power demand; and
controlling the first valve and the second valve, independently from each other, through the respective first and second measurement and control device, to increase or decrease a flow rate of the refrigerant fluid cooled by the chiller such that either the air in the air filter chamber reaches the predetermined first temperature value associated with the predetermined first power value of the gas turbine in the first degradation curve, or the air in the electrical reversible machine reaches the predetermined second temperature value associated with the predetermined second power value of the electrical reversible machine in the second degradation curve, depending on the power demand.

* * * * *